United States Patent [19]

Tarpley, Jr. et al.

[11] Patent Number: 4,597,547
[45] Date of Patent: Jul. 1, 1986

[54] LOGIC CIRCUIT FOR DETECTING REVERSE ROTATION OF A TAKE-UP REEL IN A TAPE TRANSPORT MECHANISM

[75] Inventors: Gerald W. Tarpley, Jr.; Anne M. Bardon, both of Romulus, Mich.

[73] Assignee: Ford Motor Company, Dearborn, Mich.

[21] Appl. No.: 719,774

[22] Filed: Apr. 3, 1985

[51] Int. Cl.⁴ .................... G11B 15/48; G11B 15/093; B65H 59/38
[52] U.S. Cl. .................... 242/191; 360/74.2
[58] Field of Search .............. 242/186, 191, 200–210; 360/71, 73, 74.1, 74.2

[56] References Cited

U.S. PATENT DOCUMENTS

| | | | |
|---|---|---|---|
| 3,433,428 | 3/1969 | Schatteman | 242/55.13 |
| 3,488,017 | 1/1970 | Schatteman | 242/191 |
| 3,932,890 | 1/1976 | Ueki et al. | 360/74 X |
| 3,977,623 | 8/1976 | Bagby et al. | 242/191 |
| 4,114,830 | 9/1978 | Hoshi et al. | 242/191 |
| 4,348,702 | 9/1982 | Taraborrelli | 360/74.2 X |
| 4,442,985 | 4/1984 | Kishi et al. | 242/186 |
| 4,494,712 | 1/1985 | Godwin, Jr. et al. | 242/191 |
| 4,508,280 | 4/1985 | Hayosh et al. | 242/191 |

Primary Examiner—Donald Watkins
Attorney, Agent, or Firm—Paul K. Godwin, Jr.; Clifford L. Sadler

[57] ABSTRACT

The invention provides sensing switches for indicating proper rotation of a take-up reel in a tape recorder-player and for sensing reverse rotation of the take-up reel and provides a logic circuit for stopping the drive of the take up reel when the tape is not properly fed or when the take-up reel rotates in a reverse direction.

8 Claims, 11 Drawing Figures

FIG. 5, FIG. 6, FIG. 7

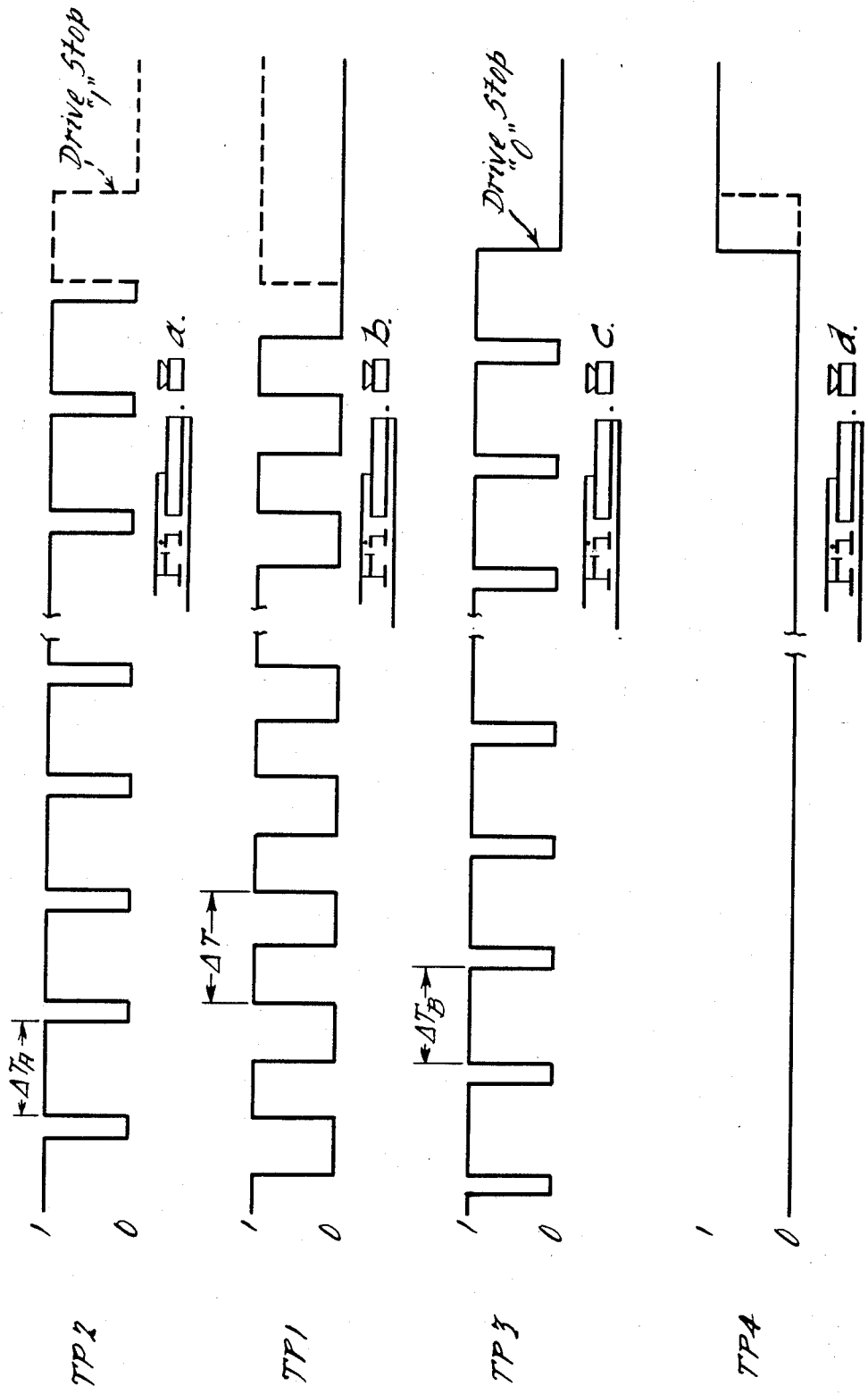

LOGIC CIRCUIT FOR DETECTING REVERSE ROTATION OF A TAKE-UP REEL IN A TAPE TRANSPORT MECHANISM

BACKGROUND OF THE INVENTION

1. Field of the Invention

The present invention is directed to the field of web transport mechanisms and more particularly to magnetic tape decks and improvements therein.

2. Description of the Prior Art

Reel-to-reel type tape transport mechanisms, especially those which utilize tape cassettes, are subject to tape fouling. One of the causes of tape fouling occurs when the tape drive mechanism is initially engaged with the tape reels. A rotationally driven capstan engages the tape between itself and a biased pinch roller and pulls the tape across a play/record head. A take-up reel is also rotationally driven, through a slip clutch, to take up the slack in the tape after it passes from the capstan. However, at the instant of initial start-up, a loop often develops between the capstan and the take-up reel before the take-up reel has had a chance to remove all the slack in the tape between the reel and the capstan. Depending upon the slackness of the tape wound on the take-up reel, and the lightness of the tape, the loop sometimes develops sufficient inertia to instantaneously wrap around the capstan, become caught between the incoming tape and the capstan, and be wound thereon. When this capstan windup occurs, the clutch driven take-up reel reverses its direction of rotation, due to the tape being drawn therefrom and wound onto the capstan. The windup continues until it is either audibly detected and stopped by the operator or binds up the capstan/pinch roller mechanism.

When detected and stopped, the tape must be carefully unwound from the capstan by hand. However, in some cases, the woundup tape is folded and wrinkled so badly that it must be discarded.

U.S. Pat. No. 4,348,702; U.S. Pat. No. 4,494,712; and commonly assigned copending U.S. patent application Ser. No. 565,768, now Pat. No. 4,508,280 are incorporated herein by reference, since each discuss this problem and propose separate techniques to overcome it.

SUMMARY OF THE INVENTION

The present invention is an alternative to prior art solutions and in some ways an improvement, since it provides a circuit by which reverse motion of a take-up reel spindle is immediately sensed and excessive tape windup is prevented.

The invention is embodied as a plurality of take-up reel rotation sensing switches that are monitored by a unique logic circuit. The sensing switches are configured and mounted so as to produce a proper switch activation sequence when the take-up reel is properly driven and to provide an improper activation sequence when the take-up reel is rotated in the opposite direction. The logic circuit monitors the switch activation and enables the application of continuous drive energy to the tape drive mechanism as long as the sequence is of the correct sequence and above a predetermined frequency (rotation rate). If the frequency of switch activation drops below the predetermined level or the switch activation sequence changes, drive power is inhibited, or reversed, depending upon the design of the tape deck mechanism.

It is an object of the present invention to provide a device which senses the effects of capstan tape windup on the take-up reel and immediately disables the active engagement of the capstan against the pinch roller or suspends rotation of the capstan.

It is another object of the present invention to provide a rotation sensing means which prevents excessive tape fouling by distinguishing between forward take-up reel motion in a first direction caused by a conventional drive mechanism and reverse take-up reel motion that may be caused by tape windup on the capstan.

It is a further object to the present invention to provide a configuration of at least three (3) motion sensing switches individually connected to a logic circuit such that the rotational direction of the take-up reel can be distinguished according to the sequential activation of the switches.

A novel feature of this invention is the ability to detect the improper (reverse) spindle rotation during "tape-eating" or "tape-fouling" whereby the sensed reversing of the spindle rotation will cause either an automatic ejection of the cartridge, stopping of the motor, or reversing of the tape drive direction, depending upon the design of the tape deck.

One of the more important features of this invention is the ability to instantaneously sense and distinguish take-up reel rotation direction to prevent damage of the tape. In this regard, it provides an improvement over the prior art which use mechanical devices (e.g. ratcheting mechanisms or mechanical vanes) in conjunction with conventional stopping circuits. Those stopping circuits employ time-constant (resistor-capacitor) charging networks to stop the tape drive operation and are typical of the type described in U.S. Pat. No. 3,488,017 which is also incorporated herein by reference.

The time-constant in such prior art stop circuit is normally on the order of one to two seconds. Such a relatively long time may allow the mechanism to continue to run and either wrap the tape on the capstan and/or stretch and break the tape before the time-constant charge cycle interrupts the operation.

Cassette tape is typically pulled by the capstan by a rate of 1⅞ (1.875) inches per second. Therefore, by using a typical time-constant of 1.6 seconds it can be seen that up to three inches of tape could end up wrapped on the capstan before the conventional stop circuit inhibits the drive mechanism. The present invention senses the problems and outputs a "stop" signal within a fraction of a turn of the take-up reel.

BRIEF DESCRIPTION OF THE DRAWINGS

FIGS. 5, 6 and 7 are truth tables used to illustrate the operation of the logic circuit shown in FIG. 4.

FIGS. 8A–8D illustrate bi-level signals present at corresponding test points within the stop circuit 200 shown in FIG. 4.

DETAILED DESCRIPTION OF THE PREFERRED EMBODIMENT

Figure 1:
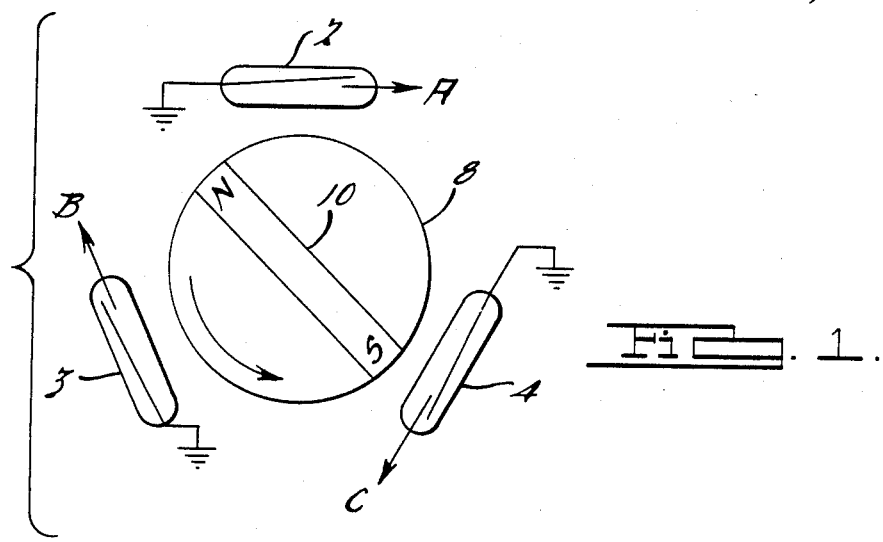
FIG. 1 illustrates an embodiment of the take-up reel sensors using three (3) reed type switches and a rotating actuation magnet.

In FIG. 1, a magnet 10 is shown mounted for rotation on the base of a take-up reel spindle platform 8 of a tape deck (not shown). The disposition of the magnet 10 with respect to the take-up reel spindle platform 8 is much like that shown in FIG. 5 of the aforementioned U.S. Pat. No. 4,494,712. A plurality of reed switches 2, 3 and 4 are disposed about the periphery of the rotating magnet 10 so as to be actuated from open to closed positions whenever the magnetic field direction and intensity is sufficient. In the illustrated embodiment, the switches close when the north pole of the magnet 10 is rotated to a position adjacent to the switch. Therefore, for a counterclockwise rotation, as seen from above, of the magnet 10, the switches will be actuated in a 2-3-4-2-3-4 . . . sequence. In contrast, a clockwise rotation of the magnet 10 will cause an opposite sequential actuation of switches 2-4-3-2-4-3 . . .

Figure 2:
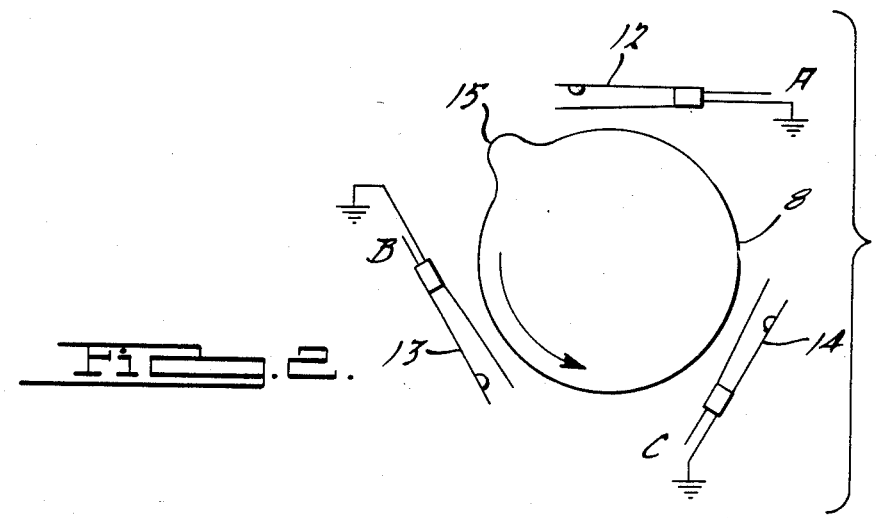
FIG. 2 illustrates an embodiment of the sensor portion of the invention using three (3) cam type switches and a rotating actuation cam.

FIG. 2 illustrates an alternative switch arrangement whereby a plurality of cam actuated switches 12, 13 and 14 are disposed about the rotating spindle platform 8. A cam actuator 15 is attached to the spindle platform 8 so as to close respective switches whenever it is rotated to a position in contact with a moveable arm of a cam switch. As in FIG. 1, there are at least three (3) cam switches disposed about the perimeter of the spindle platform 8 so as to be actuated in known sequence once for each revolution of spindle platform.

Figure 3:
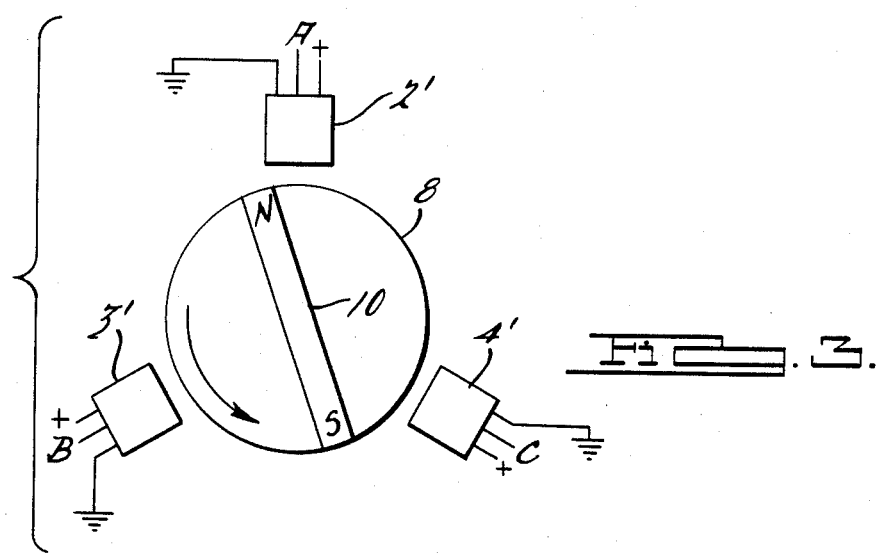
FIG. 3 illustrates an embodiment of the sensor portion of the invention using three (3) Hall Effect type sensors and a rotating actuation magnet.

FIG. 3 illustrates an alternative means for sensing the rotation of a take-up reel spindle by utilizing a magnet 10 mounted on a spindle platform 8, such as shown in FIG. 1, in combination with a plurality (at least three) Hall Effect sensors disposed about the perimeter of the spindle platform 8. The Hall Effect sensors 2', 3' and 4' are conventional in that they each employ wave shaping circuitry to provide transistorized switching in response to the rotation of the magnet 10. Each of the rotation sensor switches shown in FIGS. 1-3 have a similar characteristic of being electrically energized to provide a bi-level signal output indicative of the rotational position, and rotational speed of the take-up reel.

Figure 4:
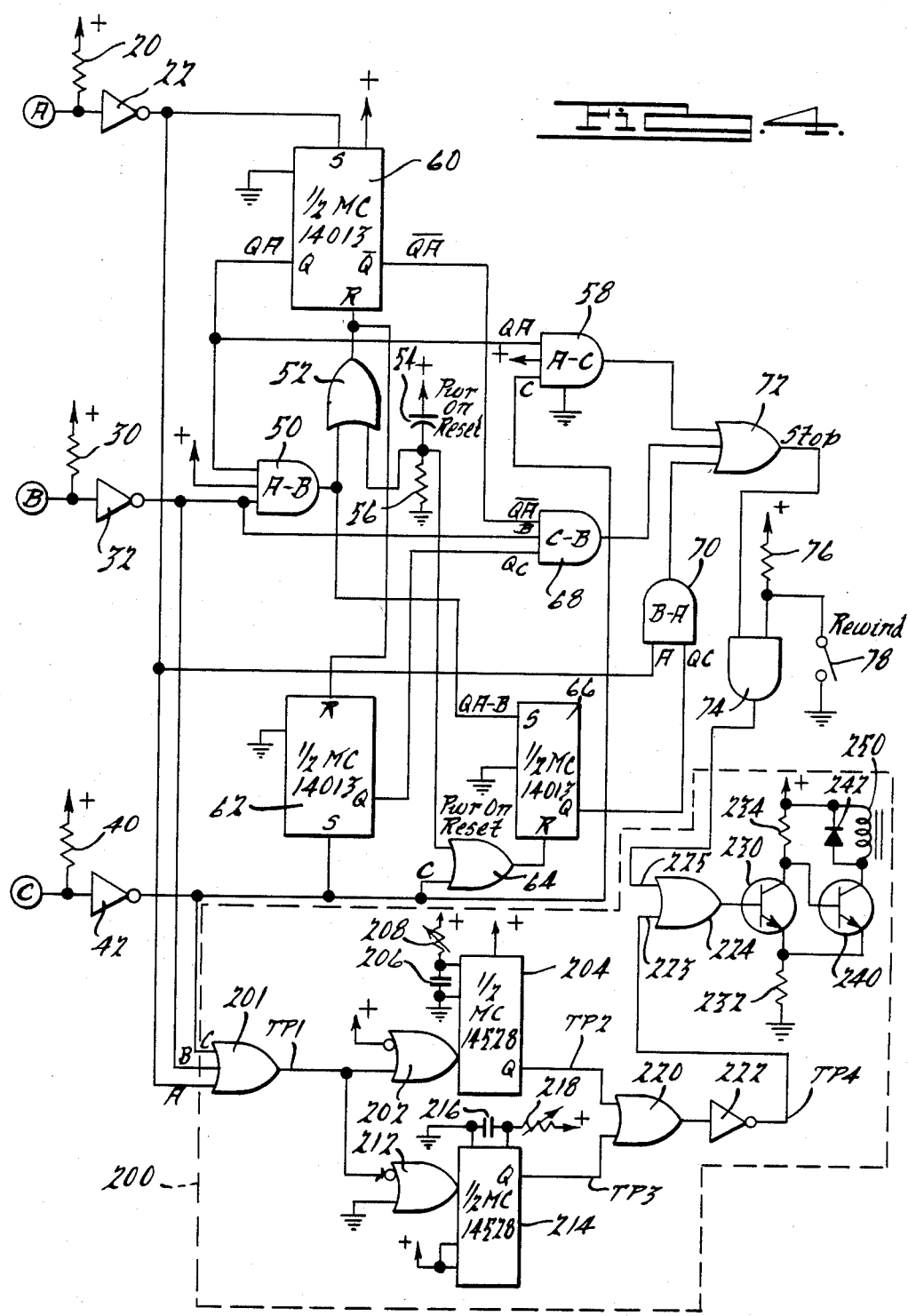
FIG. 4 is a schematic of the sensor logic circuitry embodying the present invention.

FIG. 4 illustrates the reverse rotation sensing logic circuit employed to detect reverse rotation of the take-up reel spindle platform 8, along with a stop motion sensing circuit 200. Both the reverse rotation logic sensing circuit and the stop sensing circuit are connected to a drive latching mechanism so that the output from either circuit can be used to stop the tape drive. The three (3) input terminals A, B and C are provided to be connected to corresponding sensors as exemplified in FIGS. 1, 2 and 3. Input terminal A is connected to a pull-up resistor 20 and the input terminal of a buffer amplifier 22. Input terminal B is connected to a pull-up resistor 30 and the input terminal of a buffer amplifier 32. Input terminal C is connected to a pull-up resistor 40 and the input terminal of a buffer amplifier 42. Each resistor 20, 30 and 40 is connected to the B+ power supply so that the input terminal of each buffer amplifier 22, 32 and 42 will be biased on a relatively high level until its corresponding sensor switch A, B or C is actuated and grounds the input terminal. For the period of time each sensor switch is grounded, the output of the corresponding buffer amplifier 22, 32 or 42 will provide a relatively high level output signal that will hereafter be termed a "1", while a relatively low output signal will be termed a "0".

The reverse rotation sensing logic circuit shown in FIG. 4 additionally includes three (3) bi-stable multivibrator circuits 60, 62 and 66 that are each designated as commercially available ½ MC14013 integrated circuits. Each of the multivibrator circuits 60, 62 and 66 are connected to be reset when the circuit is initialized by connecting B+ power through capacitor 54. An initialization pulse is formed by capacitor 54 and associated resistor 56 and that initialization pulse is supplied through an OR gate 52 to reset multivibrator circuits 60 and 62. The initialization pulse is also connected through an OR gate 64 to reset multivibrator circuit 66.

AND gate 58, 68 and 70 are respectively provided to output a high level signal to an OR gate 72 that provides the stop signal to the stop motion sensing circuit 200 in the event a reverse rotation is detected. AND gate 58 provides a 1 output signal to OR gate 72 whenever the reverse switching sequence of A to C is detected. AND gate 68 provides a 1 output signal to OR gate 72 when the reverse switching sequence of C to B is detected. AND gate 70 provides a 1 output signal to OR gate 72 when a reverse sequence of B to A is detected. Accordingly, only less than ⅔ rotation in the reverse direction is required to achieve reverse rotation detection and to cause immediate deactivation of the drive circuit of the tape deck. The output of OR gate 72 providing the stop signal is shown in the present embodiment as being connected to an input terminal of an AND gate 74. The enabling input terminal of the AND gate 74 is connected to a resistor 76 and to a rewind switch 78. In the event the tape deck is switched to its rewind mode, switch 78 is closed. With switch 78 closed, the input terminal is grounded and the AND gate 75 is inhibited. When the tape deck is in the rewind mode, the take-up reel will be rotated in its reverse direction, along with the supply reel, and since such rotation is intended, the output of the reverse rotation logic is therefore blocked by the inhibited AND gate 74.

In normal forward operation, the rewind switch 78 will be opened allowing the enabling input terminal of AND gate 74 connected to resistor 76 to be at a 1 level. In the event a stop signal is output from the OR gate 72, the output of AND gate 74 switches to a 1 level. The output of AND gate 74 is supplied to stop circuit 200 via input line 225. Input line 225 is connected to an OR gate 224, which provides a bi-level control to the tape drive latching circuit. The latching circuit comprises transistor 230, transistor 240 and a latching relay coil 250. When the OR gate 224 provides a 0 level output, transistor 230 is biased "OFF" in its nonconducting state and transistor 240 is biased "ON" in its conducting state. When transistor 240 is ON, a current path to ground is provided for latching relay coil 250, thereby energizing the relay and providing energization to the tape deck drive mechanism in a conventional manner. As soon as one of the input lines 225 or 223 connected to OR gate 224 is switched to a 1 level, transistor 240 is biased off and relay coil 250 is de-energized.

Figures 5, 6, 7:
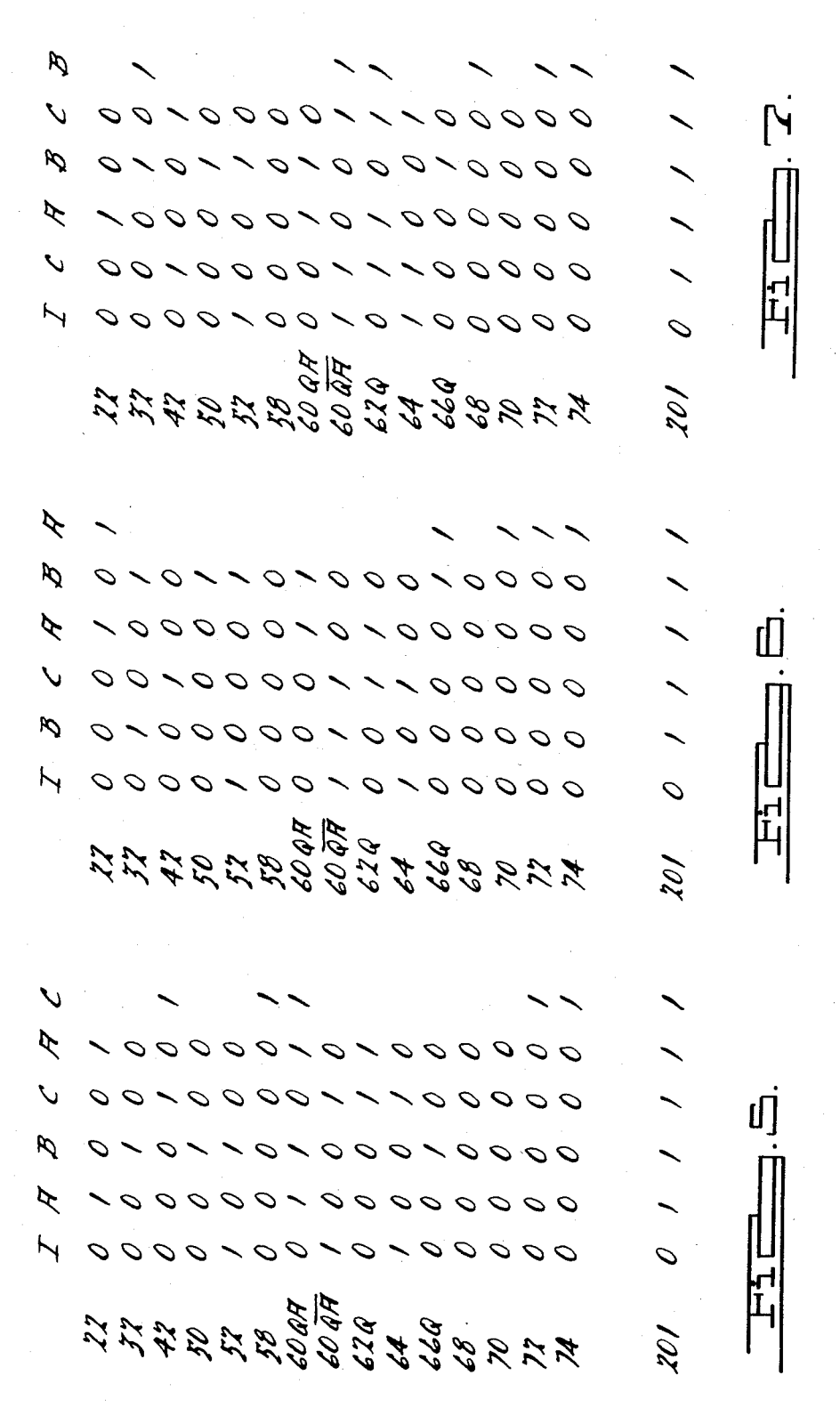

The truth table shown in FIG. 5 illustrates the outputs of the elements shown in the reverse rotation sensing logic circuit of FIG. 4 during the initialization pulse "I" and the sequential activation of switches A, B, C, A followed by an exemplified reverse rotation that occurs between A and C. For instance, when initialization pulse is applied, due to turning the B+ power on, the output of OR gate 52 is at a 1 level which resets multivibrators 60 and 62 and the output of OR gate 64 resets multivibrator 66. In multivibrator 60, the QA output is at a 0 and the $\overline{QA}$ is at a 1 level. The Q output from multivibrator 62 is at a 0 level and the Q output from multivibrator 66 is at a 0 level. Although the first switch signal after initialization may be either A, B or C, FIG. 5 illustrates the example wherein the A switch is the first one activated after the initialization pulse and normal forward rotation of the take-up reel 8 commences. Therefore in the second column of FIG. 5 the output of buffer amplifier 22 switches to a 1 level and is applied to set multivibrator 60 and thereby change the QA output to a 1 level and the $\overline{QA}$ output of 60 a 0 level. When the B switch is activated immediately following the A switch, the output of buffer amplifier 32 shows a 1 output signal which is applied to an input terminal of AND gate 50 along with the 60QA signal. Therefore, the output of AND gate 50 switches to a 1 level. The output of AND gate 50 signifies a sequence of A to B and is provided through an OR gate 52 to reset multivibrator 60. The output of AND gate 50 is also applied as a QA—B signal to set multivibrator 66 and provide a 66Q output 1 level. The 66Q signal is applied to one of the input terminals of AND gate 70 to thereby enable AND gate 70 to signal a reverse rotation of the take-up reel 8 in the event it occurs due to a reactuation of the A switch following the actuation of B switch.

In the FIG. 5 truth table, the normal sequence is shown from B to C so that when the C switch is actuated, the output of buffer amplifier 42 provides a 1 signal to reset multivibrator 66 through an OR gate 65 and thereby disable AND gate 70. The 1 level from buffer amplifier 42 is also used to set multivibrator 62 and switch the 62Q output to a 1 level that enables AND gate 68 as a QC signal along with the $\overline{QA}$ signal from multivibrator 60, in the event a C to B reverse rotation occurs. In normal sequence, the A signal following the C signal causes the multivibrator 60 to be set, providing a 60QA 1 level that is used to enable AND gate 58 in the event of an A to C reverse rotation sequence. In the truth table shown in FIG. 5, the A to C reverse rotation is illustrated whereby the output of AND gate 58 is shown switched to a 1 level when the output of buffer amplifier 42 provides the C output to one of the input terminals of the enabled AND gate 58. The output of AND gate 58 thereby provides an output signal which is converted to a "stop" signal through OR gate 72 in the manner described above.

FIG. 6 illustrates a truth table in which the normal forward take-up reel rotation causes output signals to occur at the various elements in the circuit. In FIG. 6, a reverse rotation is shown occurring from B to A, whereby AND gate 70 is shown as enabled by the 1 level signal 66Q occurring when the B switch is actuated. The A signal from buffer amplifier 22, occurring after the B signal, is connected to the other input terminal of enabled AND gate 70 to be gated through and provide a stop signal output from OR gate 72.

FIG. 7, like FIGS. 5 and 6 illustrates the normal sequence of take-up reel rotation and the various output signals that occur at the designated points of the logic circuit. However, the truth table of FIG. 7 provides an analysis of the signals present to sense a reverse rotation that may occur as indicated by a C to B switch actuation sequence. In that case, the 60$\overline{QA}$ and the 62Q signals at 1 levels enable the C to B AND gate 68 upon receiving the C signal. If a B switch actuation follows C, the B signal from buffer amplifier 32 is gated through enabled AND gate 68 and is output from OR gate 72 as a stop signal.

Automatic stop circuit 200 includes an OR gate 201 which is connected to receive input signals from the take-up reel sensor switches and to output a pulse for each actuation of the sensor switches. The sensor switch pulses are then fed to a pair of monostable multivibrators 204 and 214 via respective OR gates 202 and 212. The multivibrators 204 and 214 used in the described embodiment are commercially available ½ MC14528 integrated circuits. The multivibrator 204 responds to the beginning of the sensing pulse output from OR gate 201 as indicated by its leading edge or positive going portion and switches to its unstable state for a predetermined period of time dictated by a capacitor 206 and variable resistor 208 network. The Q output from multivibrator 204 switches from a 0 to a 1 state for that period of time.

The multivibrator 214 responds to the end of the pulse output from OR gate 201 as indicated by its trailing edge or negative going portion and switches to its unstable state providing a Q=1 output signal. The length of time the multivibrator 214 is in its unstable state is dictated by a capacitor 216 and variable resistor 218 network. The Q outputs from multivibrators 204 and 214 are respectively fed through OR gate 220 to an inverter circuit 222. The output of the inverter circuit 222 is fed via input line 223 to OR gate 224.

Referring to FIG. 8B, the normal pulse output of OR gate 201 is shown measured at test point 1 (TP1) for a normally rotated take-up reel of a tape deck. Assuming the sensor switches providing the A, B and C output pulse are symmetrically arranged, each revolution of the take-up reel will provide three (3) pulses at ΔT intervals of approximately 400 m sec. for normal play speed.

FIG. 8A illustrates the pulse output of multivibrator 204 taken at test point 2 (TP2) as being triggered by the leading edge of the pulse at test point 1 and being held at a 1 level for a time period ΔTA that is less than that expected for ΔT (370 ms), as determined by the capacitor 206 and resistor 208 time-constant.

In FIG. 8C, the output of the multivibrator 214 taken at test point 3 (TP3) illustrates that the multivibrator 214 enters its unstable state and provides a 1 output level in response to the trailing edge or negative going portion of the pulses output from OR gate 201. The output pulse from the multivibrator 214 lasts for a predetermined period of time ΔTB which is determined by the capacitor 216 and resistor 218 time-constant.

As can be seen in FIGS. 8A, 8B, 8C and 8D, when the take-up reel is turned at a normal rate of a predetermined value, the output pulses appearing at TP2 and TP3 are overlapping so that the output of OR gate 220 appears as a constant 1 value. That constant 1 value is inverted through inverter 222 and shows up at test point 4 (TP4) in FIG. 8D as a constant 0 level.

The right hand portions of FIGS. 8A, 8B, 8C and 8D illustrate the alternative positions that the take-up reel may stop and the effect of that position on the sensing circuit. For instance in FIG. 8B, the solid line portion of the wave diagram at the right hand side indicates that the take-up reel has stopped at a point where no switch is actuated and the output at OR gate 201 is at a 0 level. Stopping of the cassette drive mechanism will occur as soon as the output of the OR gate 220 switches to a 0 level. This occurs when the outputs from multivibrators 204 and 214 are both at 0 levels. In FIG. 8C the last pulse output from multivibrator 214 extends past that which is output from multivibrator 204 and will hold the drive circuit latched through the activation of relay 250 until such time as the output pulse of multivibrator 214 goes to 0. At that point the output of inverter 222 TP4 will switch to a high level as shown in FIG. 8D and cause transistor 240 to be biased off.

On the other hand if the take-up reel stops in a position in which one of the sensor switches is actuated closed, the output of the OR gate 201, shown as the dashed line portion in FIG. 8B, will be held at a 1 level. In this case, the output of multivibrator 204 will be the last pulse held at the 1 level to OR gate 220, since it is the last multivibrator of the two to respond to the signals from OR gate 201. Likewise when the output signal from 204 drops to 0, it will cause the relay 250 to be de-energized as in the manner described above.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. In a tape recorder-player of the type wherein the tape is fed by means of a tape drive from a supply reel to a take-up reel rotating in a predetermined direction, an automatic system for detecting reverse rotation of said take-up reel comprising:
    at least three switch elements actuated in a first sequence during each rotation of said take-up reel in said predetermined direction and in a second sequence during each rotation of said take-up reel in the reverse direction:
    a logic means connected to said switch elements for monitoring the actuation of said switch elements and outputting a stop signal only when said second sequence of actuation of said switch elements is monitored; and
    a stop circuit connected to said switch elements and to said logic means for disabling said tape drive when the frequency of rotation is detected as being below a predetermined rate or said stop signal is output from said logic means.

2. An automatic system as in claim 1, each switch element provides a bi-level step signal to said logic means and said stop circuit for each actuation;
    said stop circuit includes a first monostable multivibrator which changes to its unstable state for a first predetermined period of time whenever a step signal from said switch elements changes from a relatively low level to a relatively high level;
    a second monostable multivibrator that changes to its unstable state for a second predetermined period of time whenever a step signal from said switch elements changes from a relatively high level to a relatively low level; and
    means for enabling said tape drive only as long as either said first or second multivibrators are in their unstable states and for disabling said tape drive when said first and second multivibrators are concurrently in their stable states.

3. An automatic system as in claim 2, wherein said enabling means of said stop circuit is also responsive to a stop signal output from said logic means.

4. An automatic circuit as in claim 1, wherein said logic means inhibits said stop signal when said supply reel and said take-up reel are both driven in said reverse rotation direction by said tape drive means, as in a rewind mode.

5. In a tape transport which includes means for feeding magnetic tape across a record/play head from a supply reel to a take-up reel, an automatic means for monitoring the rotation of movement of said take-up reel and providing an output signal that distinguishes between said take-up reel rotating in a predetermined direction and in an opposite direction comprising:
    means for sensing the rotational movement of said take-up reel at at least three positions within each rotation and providing a corresponding output signal at each position;
    means for receiving said sensing means output signals and providing an output signal at a first level when the sequence of said sensing means output signal indicates the take-up reel is rotating in a predetermined rotational direction and at a second level when the sequence of said sensing means output signal indicates the take-up reel is rotating in the opposite direction.

6. A tape deck as in claim 5, wherein said take-up reel contains a magnetic field generating means that rotates said field with the rotation of said take-up reel and said sensing means includes at least three magnetic field sensors that are spaced about the perimeter of said magnetic field generating means and electrically energized to provide electrical output signals reflecting the magnetic field direction and intensity at the respective locations.

7. A tape deck as in claim 6, wherein said magnetic field sensors are Hall Effect sensors.

8. A tape deck as in claim 6, wherein said magnetic field sensors are reed switches.

* * * * *